United States Patent

Yoshioka et al.

(10) Patent No.: US 6,496,905 B1
(45) Date of Patent: Dec. 17, 2002

(54) WRITE BUFFER WITH BURST CAPABILITY

(75) Inventors: Shinichi Yoshioka, San Jose, CA (US); Hsuan-Wen Wang, Sunnyvale, CA (US); Rajesh Chopra, Sunnyvale, CA (US); Jun-Wen Tsong, San Jose, CA (US)

(73) Assignee: Hitachi, Ltd., Chiyoda--Ku (JP)

( * ) Notice: Subject to any disclaimer, the term of this patent is extended or adjusted under 35 U.S.C. 154(b) by 0 days.

(21) Appl. No.: 09/410,555

(22) Filed: Oct. 1, 1999

(51) Int. Cl.$^7$ .............................................. G06F 12/00
(52) U.S. Cl. ....................... 711/154; 711/143; 711/144; 711/145; 711/209
(58) Field of Search ............................... 711/154, 143, 711/144, 145, 209

(56) References Cited

U.S. PATENT DOCUMENTS

| | | | | |
|---|---|---|---|---|
| 5,488,709 A | * | 1/1996 | Chan ........................... 395/445 |
| 5,530,965 A | | 6/1996 | Kawasaki et al. ........... 395/800 |
| 5,561,780 A | * | 10/1996 | Glew et al. ................... 395/453 |
| 5,608,881 A | * | 3/1997 | Masamura et al. .......... 395/306 |
| 5,657,273 A | | 8/1997 | Ayukawa et al. ........ 365/189.01 |
| 5,682,545 A | | 10/1997 | Kawasaki et al. ........... 395/800 |
| 5,751,621 A | | 5/1998 | Arakawa ................ 364/748.07 |
| 5,774,701 A | | 6/1998 | Matsui et al. ................ 395/556 |
| 5,778,237 A | | 7/1998 | Yamamoto et al. ..... 395/750.04 |
| 5,796,978 A | | 8/1998 | Yoshioka et al. ............ 395/416 |
| 5,832,248 A | | 11/1998 | Kishi et al. ................... 395/376 |
| 5,835,963 A | | 11/1998 | Yoshioka et al. ............ 711/207 |
| 5,848,247 A | * | 12/1998 | Matsui et al. ................ 395/284 |
| 5,860,112 A | * | 1/1999 | Langendorf et al. ......... 711/143 |
| 5,860,127 A | | 1/1999 | Shimazaki et al. .......... 711/167 |
| 5,867,726 A | | 2/1999 | Ohsuga et al. ........... 395/800.32 |
| 5,884,092 A | | 3/1999 | Kiuchi et al. ........... 395/800.35 |
| 5,892,978 A | * | 4/1999 | Munguia et al. ............... 710/33 |
| 5,918,045 A | | 6/1999 | Nishii et al. .................. 395/584 |
| 5,930,523 A | | 7/1999 | Kawasaki et al. ....... 395/800.32 |
| 5,930,833 A | | 7/1999 | Yoshioka et al. ............ 711/210 |
| 6,014,728 A | * | 1/2000 | Baror .......................... 711/133 |
| 6,023,757 A | | 2/2000 | Nishimoto et al. .......... 712/209 |
| 6,038,582 A | | 3/2000 | Arakawa et al. ............. 708/501 |
| 6,070,234 A | | 5/2000 | Shimazaki et al. .......... 711/167 |
| 6,170,040 B1 | * | 1/2001 | Lee et al. ..................... 711/143 |
| 6,279,077 B1 | * | 8/2001 | Nasserbakht et al. ......... 710/52 |

FOREIGN PATENT DOCUMENTS

| | | | | |
|---|---|---|---|---|
| JP | 8320796 A | 12/1996 | ............. G06F/9/46 |
| JP | 8329687 A | 12/1996 | ........... G11C/15/00 |
| JP | 9212358 A | 8/1997 | ............. G06F/9/38 |
| JP | 9311786 A | 12/1997 | ............. G06F/9/38 |
| JP | 10106269 A | 4/1998 | ......... G11C/11/413 |
| JP | 10124484 A | 5/1998 | ........... G06F/17/10 |
| JP | 10177520 A | 6/1998 | ........... G06F/12/10 |
| SG | 9702738-7 | 7/1997 | |
| WO | WO98/13759 | 4/1998 | ............. G06F/9/46 |

* cited by examiner

*Primary Examiner*—Matthew Kim
*Assistant Examiner*—Stephen Elmore
(74) *Attorney, Agent, or Firm*—Townsend and Townsend and Crew LLP

(57) ABSTRACT

Methods and an apparatus for buffering write operations are disclosed. In one embodiment, a processing system bursts data to a bus. The processing system includes a memory cache, a write buffer unit, and a control unit. The memory cache produces an address and data. Included in the write buffer unit are a plurality of data locations coupled to the memory cache. The control unit directs the first data to any of the plurality of data locations.

18 Claims, 4 Drawing Sheets

WRITE BUFFER WITH BURST CAPABILITY

BACKGROUND OF THE INVENTION

This invention relates in general to memory writing and, more specifically, to an apparatus and methods for allowing burst writes to memory.

Performance of computer systems is heavily dependent upon memory architecture. Processors which are clocked at ever increasing frequencies suffer from bottlenecks when data is passed to dynamic random access memory (DRAM) which is external to the processor. Today, microprocessors are being clocked at frequencies upward of one gigahertz while DRAM memory is commonly clocked at frequencies less than two hundred megahertz. Memory is still evolving to operate at faster frequencies, but still memory lags behind the frequencies of microprocessors.

Because the external memory operates at a frequency much lower than the frequency of the processor, the processor occasionally must wait for a write operation to complete before issuing new instructions. For example, a number of writes to external memory could stall the processor if the processor operates at a frequency of one gigahertz and the memory runs at two hundred megahertz because five write operations can be issued by the processor for each memory cycle. As those skilled in the art appreciate, stalling the processor is undesirable.

Memory is written in discrete data packets. Each data packet is preceded by an address for that data packet. For each write to memory, a number of processor clock cycles are required to write each data packet. For example, in order to write four words of data, the sequence includes writing the following to the memory bus: a first address, a first word, a second address, a second word, a third address, a third word, a fourth address and a fourth word. The address cycle can take three processor clock cycles while the data cycle can take only one cycle. Transferring the above four words takes a total of sixteen clock cycles.

To increase memory bandwidth, different varieties of memory have been developed. These variants include page mode DRAM, synchronous DRAM and double data rate DRAM. These new memory variants allow bursting data to them in a way which increases data bandwidth to the memory. Bursting involves writing the address to memory once and following the address with a number of data packets. For example, to write a block of four words of data, the sequence includes writing a single address followed by the four words in succession to the memory bus. This approach presumes the block of four words are related to a single address, for example, the four words could be in adjacent memory locations. Using the same timing as the non-burst example in the preceding paragraph, the four words are transferred in seven clock cycles.

Although bursting can improve the bandwidth to memory, processing systems under-utilize this feature. A large proportion of writes to memory are single words. These single words cannot take advantage of the bursting feature in memory. Accordingly, techniques and hardware for better utilizing the burst mode of memory are desired.

SUMMARY OF THE INVENTION

According to the invention, disclosed are an apparatus and methods for buffering write operations. In one embodiment, a processing system is disclosed which bursts data to a bus. The processing system includes a memory cache, a write buffer unit, and a control unit. The memory cache produces an address and data. Included in the write buffer unit are a plurality of data locations coupled to the memory cache. The control unit directs the first data to any of the plurality of data locations.

In another embodiment, a method for optimizing storage in a write buffer unit is disclosed. First data and a first address are received. The first data is stored in the write buffer unit. Second data and a second address are also received. A determination is made whether the second address and the first address correspond to the same data block. The second data is stored in the write buffer unit.

In yet another embodiment, a method for storing data in a write buffer unit and dispensing those data to a bus is disclosed. In a first step, a plurality of data and a plurality of addresses respectively associated therewith are received. The plurality of data is arranged in the write buffer unit according to the plurality of addresses respectively associated therewith. A data block associated with a block address is burst to the bus.

DESCRIPTION OF THE SPECIFIC EMBODIMENTS

In order to prevent stalling of the processing system and more fully utilize a burst mode for writing to memory, the present invention includes a novel write buffer. This buffer, which has multiple entries, attempts to merge different write operations together in order to form a larger block of data which can be bursted to memory. By more fully utilizing the burst mode, the effective bandwidth to memory is increased. Additionally, the write buffer stores a number of write operations which reduces the chances the processing system will stall while waiting for a number of write operations to complete.

In the Figures, similar components and/or features may have the same reference label. Additionally, various components of the same type may be distinguished by following the reference label by a dash and a second label that distinguishes among the similar components. If only the first reference label is used, the description is applicable to any one of the several similar components with that same first reference label.

Figure 1:
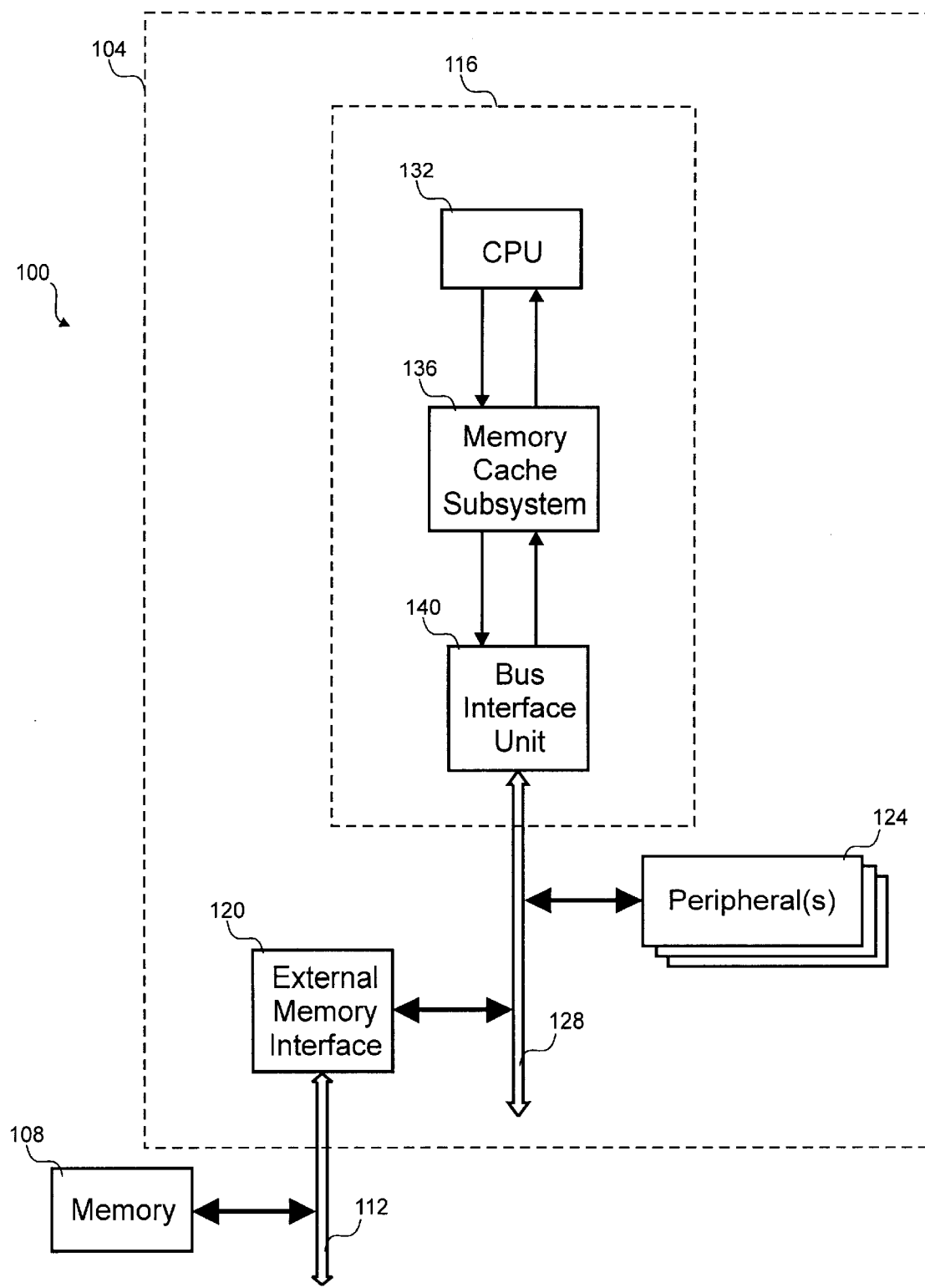
FIG. 1 is a block diagram which depicts one embodiment of a computer architecture incorporating a write buffer.

With reference to FIG. 1, an embodiment of a processing system 100, which incorporates a write buffer in a bus interface unit 140, is shown in block diagram form. Included in the system 100 are a processing chip 104 which communicates with external memory 108 by way of an off-chip bus 112. The processing chip 104 has a central processing unit (CPU) core 116 which communicates by way of an on-chip bus 128 to an external memory interface 120 and peripherals 124. Within the CPU core 116 are a CPU 132, a memory cache subsystem 136 and the bus interface unit 140.

In this embodiment, the external memory 108 is SDRAM. The external memory 108 has much larger capacity than any synchronous random access memory (SRAM) in the memory cache subsystem 136. The SDRAM operates at a one hundred megahertz frequency while the SRAM and CPU 132 operate at a four hundred megahertz frequency. Data access of the cache takes one CPU clock cycle, but data access of the external memory 108 takes at least four CPU clock cycles. In other embodiments, any type of memory which supports burst mode could be used. Additionally, the CPU core 116 and external memory 108 could operate at various frequencies which could be programmable.

A load/store unit (LSU) in the CPU 132 issues read operations and write operations as they are encountered during code execution. All write operations are sent from the CPU 132 to the memory cache subsystem 136 for possible storage in the memory cache. Not every instruction results in issuing a write operation by the LSU. Additionally, not every write to cache memory causes a write to external memory 108. This means the bus interface unit 140 usually does not receive the maximum of four memory write operations for every off-chip bus cycle which is possible because of the four to one frequency ratio between the CPU core 116 and the off-chip bus 112.

Various components of the processing system 100 are included in a memory map of the CPU core 116. The memory map is simply a correlation between an address and a data port or memory location. The external memory 108 is part of that memory map, but other things, such as the peripherals 124, are also part of that memory map. The data ports can be located in different subsystems such as the peripherals 124 or external memory 120. The address directs the data to these ports.

The cache subsystem 136 includes a cache memory and other related circuitry. Preferably, the cache is a 4-way set-associative cache which supports both write-back and write-through write operations. The cache stores thirty-two kilobytes of data divided among the four sets. However, other embodiments could configure the cache differently.

An access to external memory 108 from the memory cache subsystem 136 takes several steps. The bus interface unit 140 interfaces between the cache subsystem 136 and the on-chip bus 128. In this embodiment, the on-chip bus 128 operates at two hundred megahertz, but the CPU core 116 operates at four hundred megahertz. Bridging data between these two frequencies is the bus interface unit 140. The external memory interface 120 interfaces the on-chip bus 128 with the off-chip bus 112 which runs at one hundred megahertz. Since these two buses 112, 128 operate at different frequencies, the external memory interface converts between these frequencies. In other embodiments, the frequency of the CPU core 116 and on-chip bus 128 could be different.

Discussed in further detail below, the bus interface unit 140 includes a write buffer and other circuitry which allows queuing and combining write operations to create a burst write operation. The write buffer queues external memory write operations and attempts to concatenate single writes together to form a burst write. Sixty-four bit words or thirty-two byte blocks are received from the memory cache subsystem for writing to the external memory 108. Words can be partially filled with valid data by using a mask byte associated therewith.

Data destined for the external memory 108 is written by the bus interface unit 140 to the on-chip bus 128 in one of three ways. In this embodiment, the on-chip bus has sixty-four bits of data lines and thirty-two bits of address lines along with some control bits. Single writes to memory are performed by placing the address on the address bus lines for three CPU clock cycles and by placing the data on the data bus lines for one CPU clock cycle. Burst writes can be performed with either two words or four words associated with a single address. The two word burst operation transfers a single address followed by two words in succession and the four word burst transfers a single address followed by four words in succession. Depending upon the memory configuration, the words may be adjacent or spaced apart by some integer multiple.

Several precautions are taken in the bus interface unit 140 in order to maintain coherency of memory. The bus interface unit 140 is notified of read operations which retrieve data from external memory 108 intended for the memory cache subsystem 136 and, ultimately, the CPU 132. When a read operation is requested, which has the same address as an entry in the write buffer, that entry is drained to external memory 120. Additionally, the bus interface unit 140 is notified when a snoop is requested so that any stored write operations, which are subject to the snoop, can be drained in order to preserve memory coherency.

A number of peripherals 124 are coupled to the on-chip bus 128. These peripherals 124 perform various functions for the processing system 100 such as a serial interface, watchdog timer or direct memory interface. The peripherals 124 are mapped to the CPU core 116 address space through a series of input/output ports. In some cases, the peripherals 124 can master the buses 112, 128 and can access the memory-mapped address space without passing through the CPU 132. A process called snooping is performed before the peripheral 124 accesses memory in order to determine if a pending dirty write operation is in either the cache or write buffer would create memory coherency problems.

Figure 2:
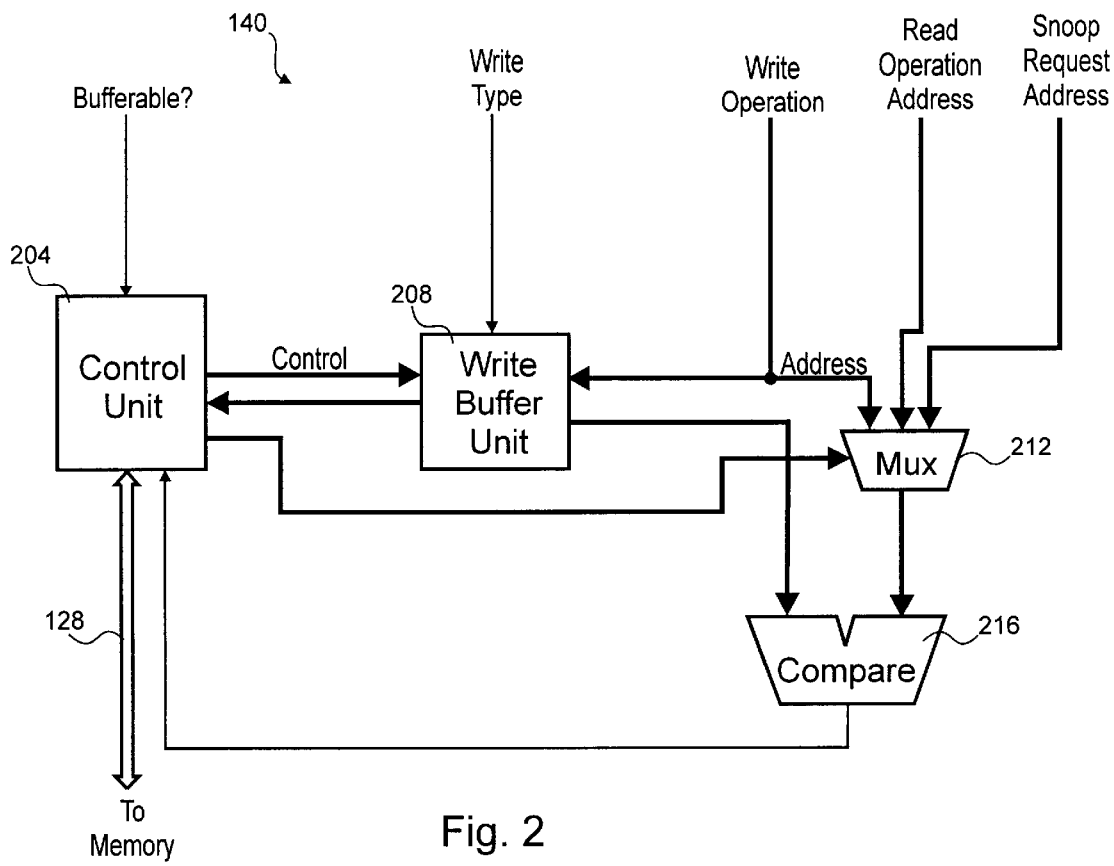
FIG. 2 is a block diagram illustrating an embodiment of portions of an external memory interface.

Referring next to FIG. 2, a block diagram of portions of the bus interface unit 140 are shown. FIG. 2 includes a control unit 204, a write buffer unit 208, a multiplexer circuit 212 and a compare circuit 216. The write buffer unit 208 buffers some write operations for later storage in memory and combines single write operations in an effort to convert them into a burst write operation.

The control unit 204 includes a number of state machines which manage the operation of the bus interface unit 140. Receiving, storing and writing data are managed by the control unit 204 in order to buffer write operations and group single writes into burst writes. The control unit 204 also prevents memory coherency problems by monitoring read operation addresses and snoop request addresses and retiring entries in the write buffer unit 208 when necessary.

Among other things, the multiplexer circuit 212 and compare circuit 216 are used to detect potential memory coherency problems. If a read operation is allowed to read from memory 108 before a queued write operation to the same address is retired from the write buffer unit 208, the read operation could return old information from the memory 108. Similarly, a snoop request is performed before a peripheral 124 attempts to master the bus 128 in order to read an address in memory 108. The snoop request determines if either the cache or the write buffer unit 208 has a pending dirty write operation. To compare addresses, the multiplexer circuit 212 selects the proper input for the compare circuit 216. The compare circuit 216 compares the addresses of read and snoop operations with the address of all entries in the write buffer unit 208 to detect potential coherency problems. The control unit 204 is notified when the compare circuit 216 produces a match such that the control unit 204 can retire to memory 108 the appropriate entry in the write buffer unit 208. During the retirement process, execution of the pending read operation from the CPU 132 or peripheral 124 is paused.

With reference to the sole table, there are several varieties of write operations which are processed by the bus interface unit 140 in different ways. The first distinction is bufferable versus non-bufferable. The memory cache subsystem 136 notifies the control unit 204 when an incoming write operation is non-bufferable. The control unit 204 relays the non-bufferable write operation to the on-chip bus without buffering. Non-bufferable write operations can be either single word writes or partial word writes and are typically writes to hardware ports which should not be delayed by a buffer.

Bufferable write operations fall into three categories, namely, non-cacheable write operations, write-back operations and write-through operations. Address ranges designated as non-cacheable are passed through the cache subsystem 136 without caching to external memory 108 for storage. The non-cacheable write operations write a single word at a time to external memory 108. Because non-cacheable write operations only have one word, they benefit from the process of combining multiple writes into a burst write operation. Data such as graphics data is typically designated as non-cacheable because its large volume would quickly overwhelm all but the largest cache memories.

Address ranges can be designated as write-back or write-through by software. In write-through mode, every write operation to the cache results in a single word write operation to external memory 108. In contrast, the write-back mode only writes to external memory 108 when a cache miss evicts a dirty cache block. In write-back mode, write operations which miss the cache may cause a dirty block in the cache to be written back to external memory 108. The dirty block has thirty-two bytes of data and is written to external memory 108 at one time as a burst write operation of four words in succession.

TABLE I

| Write Operation Type | Single Write | Burst Write |
| --- | --- | --- |
| Non-Bufferable | X | |
| Bufferable | X | X |
| Non-Cacheable | X | |
| Write-Back | | X |
| Write-Through | X | |

Write-through operations could benefit from the combining process which produces burst write operations. However, software often presumes the data in a write-through operation reaches external memory 108 quickly. Storage in the write buffer unit 208 for a long period of time could cause memory coherency problems because peripherals and/or other processors generally presume areas of memory designated as write-through are fairly up-to-date. Accordingly, in some embodiments the write-through operations are only stored in the write buffer unit 208 until the on-chip bus is free to accept a write. However, other embodiments could hold the write-through operations until forced out by a full write buffer unit 208.

Figure 3:
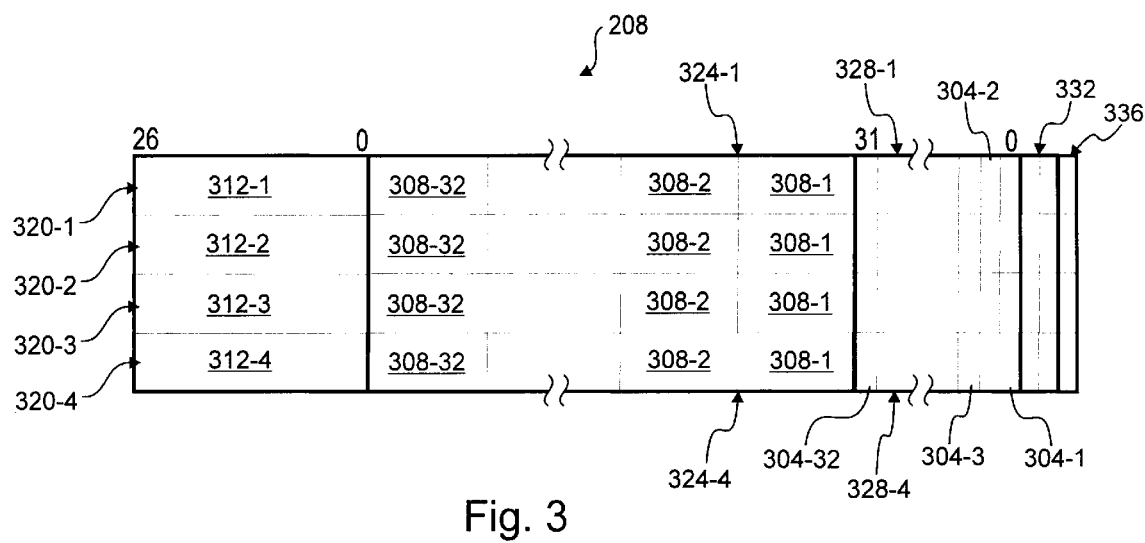
FIG. 3 is block diagram showing one embodiment of a write buffer unit which stores data associated with a number of write operations.

With reference to FIG. 3, a diagram which schematically illustrates the configuration of the write buffer unit 208 is shown. This embodiment has four entries 320. Each entry 320 includes a block address 312, a data block 324, a byte mask 328, a write type field 332, and a valid bit 336.

Single word write operations are written to an entry 320 and byte mask bits 304 are updated to reflect which bytes 308 in the block 324 contain data. In some cases, only certain bytes in a single word write may be valid. For example, the word could only have a single byte of valid data. A mask byte, sent with the write operation, is used to set the appropriate bits 304 in the byte mask 328.

Data is put in the write buffer unit 208 in increments of a word, a partial word or a block. When the entry 320 contains any data, the valid bit 336 is activated. Conversely, the valid bit 336 is deactivated when the entry 320 is retired to external memory 108.

The write type field 332 provides information on the source of the data. This information is received when the data is written to the entry and reflects whether the write is a non-cacheable write operation, a write-back operation or a write-through operation. In some embodiments, the write type field 332 is used to optimize the draining of the entries 320 in the buffer.

Figure 4:
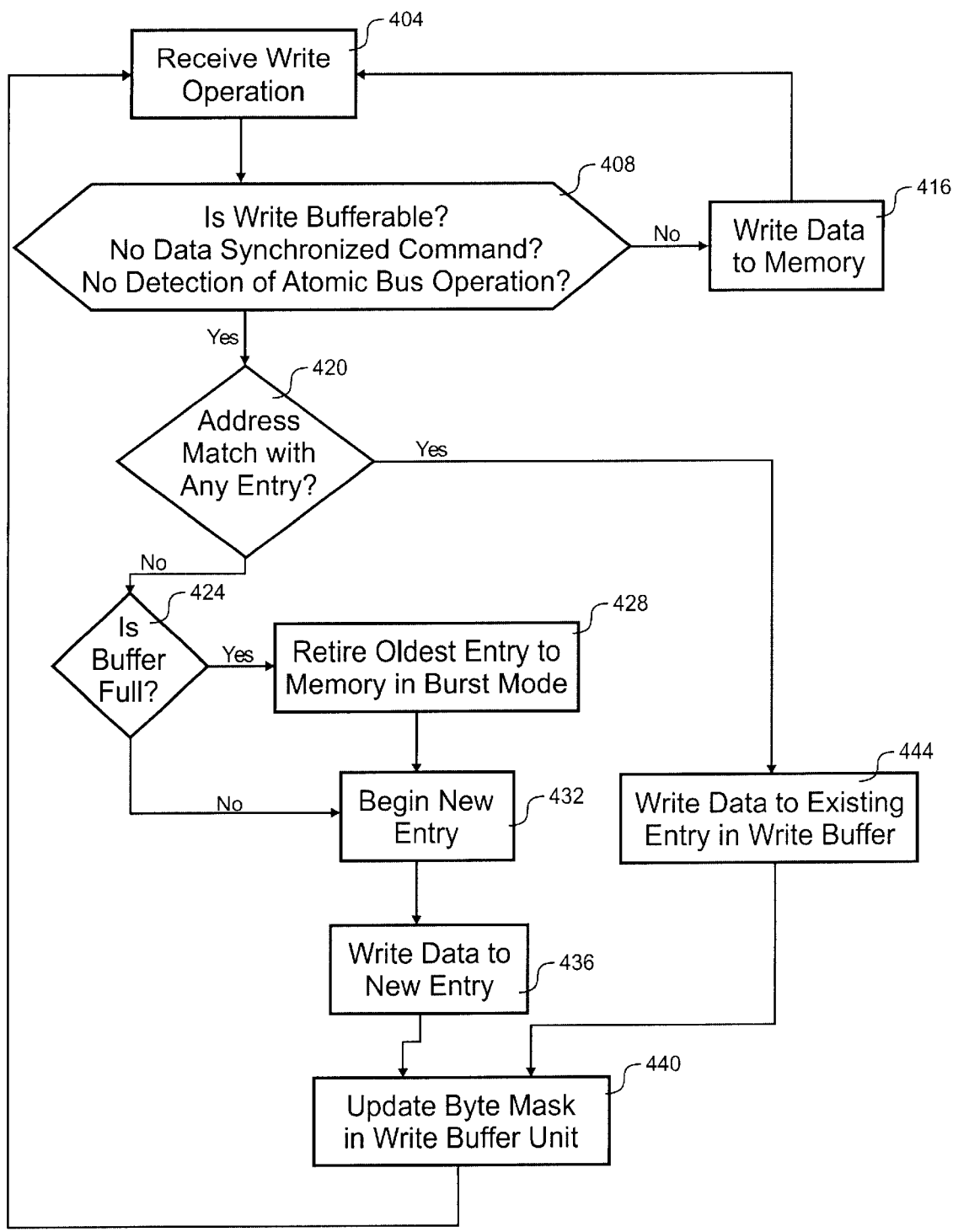
FIG. 4 is a flow diagram which shows an embodiment of a method for receiving and storing a write operation.

Referring next to FIG. 4, a flow diagram is depicted which illustrates a method for processing information by a bus interface unit 140. This embodiment retires the oldest entry 320 from the write buffer unit 208 when the buffer fills.

Processing begins in step 404 where the write operation is received from the memory cache subsystem 136. In step 408, the control unit 204 determines if the write operation is bufferable. Non-bufferable write operations are written to external memory 108 by the control unit 204 in step 416. These non-bufferable write operations can have a length of a word or partial word.

If the write operation is bufferable, processing continues to step 420. A further determination is made is step 420 as to whether the address of the received write operation matches the address 312 of any entry 320 in the write buffer 208. The multiplexer circuit 212 selects the write operation address for input to the compare circuit 216 to make this determination. If there is an existing entry 320 having a block 324 which the write operation will fit into, the data from the write operation is written to that entry 320 in step 444. The byte mask 328 is updated for that entry 320 to reflect the new data.

If there is no existing entry 320 in the write buffer unit 208 which the write operation fits into, processing continues to step 424. In step 424, yet another determination is made to determine if the write buffer unit 208 is full. A full write buffer unit 208 retires the oldest entry 320 to external memory 108 in step 428. Once there is room in the write buffer unit 208, a new entry 320 is created in step 432. In step 436, the data from the write operation is written to the entry 320. The block address 312, write type field 332, and valid bit 336 are all written into the entry 320. In step 440, the byte mask 328 is updated to reflect which bytes contain data. In this way, information is written to the write buffer unit 208.

Figure 5:
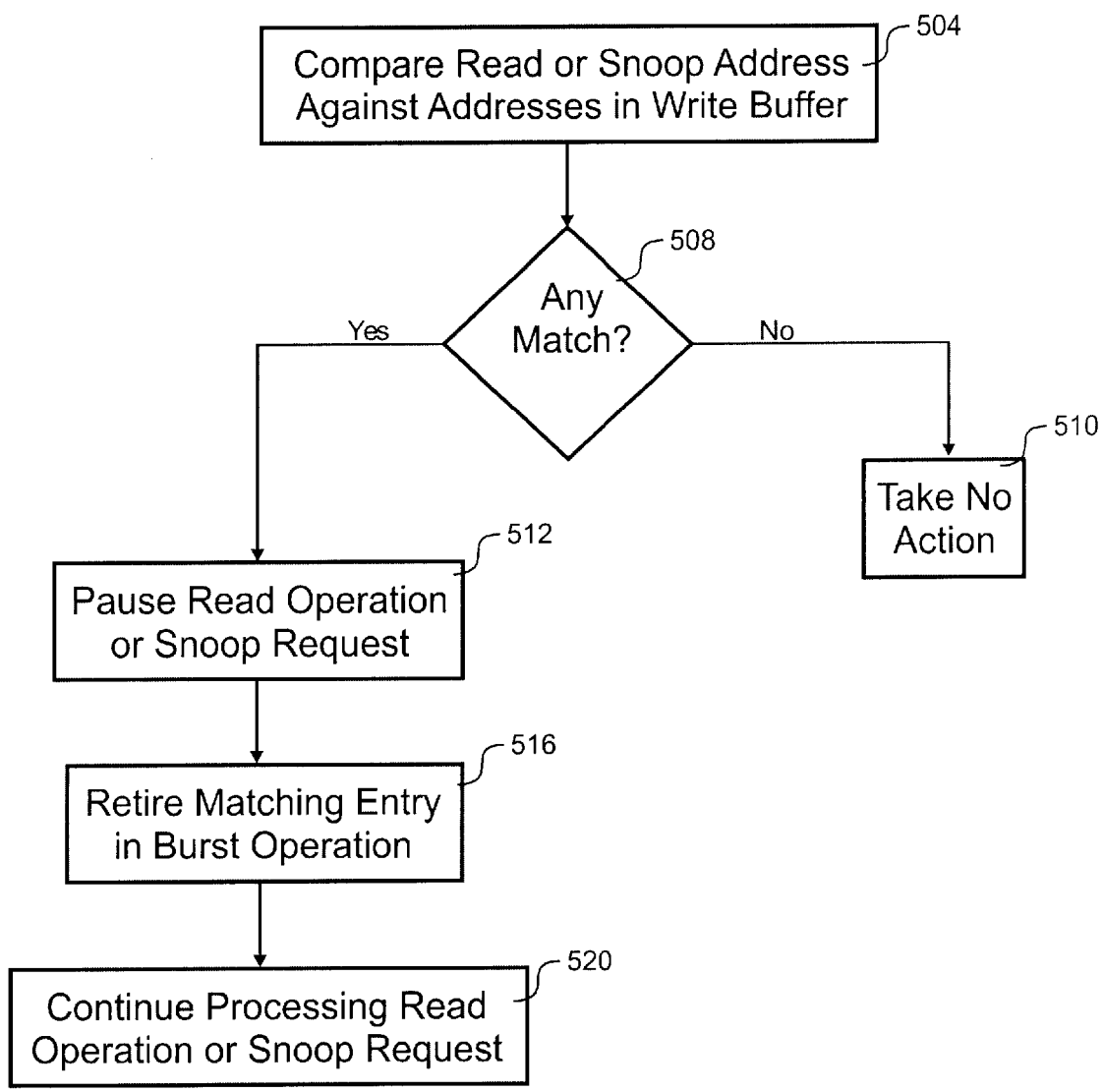
FIG. 5 is a flow diagram which demonstrates an embodiment of a method for maintaining coherency of memory.

With reference to FIG. 5, a flow diagram is shown which demonstrates how coherency is maintained even though the write buffer unit 208 can delay write operations. The process begins in step 504 where either the read address or snoop address is compared against the addresses 312 in the write buffer unit 208. Whichever of a read operation or snoop request is pending at the time is coupled to the compare circuit 216 by the multiplexer circuit 212 in order to perform this comparison. Receiving the output from the compare circuit 216, the control unit 204 determines if there is a match in step 508. If there is no match, no action is taken in step 510.

However, processing continues to steps 512, 516, and 520 if a match is found between the read operation or snoop request and an entry 320 in the write buffer unit 208. In step 512, the pending read operation or snoop request is stalled. This pausing of execution provides time for retiring the matching entry 320 in the write buffer unit 208. In some embodiments, the entries 320 could be successively removed until the matching entry 320 is retired, or the whole write buffer unit 208 could be flushed instead of selecting the matching entry 320. In step 520, processing of the read operation or snoop request continues after the queued write operation is written to external memory 108.

In light of the above description, a number of advantages of the present invention over processing systems without a write buffer are readily apparent. Several write operations are stored in the write buffer when the bus to memory is busy. This avoids stalls which would require the CPU to wait for the write to complete.

Additionally, the higher bandwidth burst writing method is used more often because single writes are combined in order to have enough data to utilize the burst writing method.

A number of variations and modifications of the invention can also be used. The bus in the above embodiment has separate data and address lines, however, other embodiments could multiplex the bus to reduce the number of lines. The above discussion relates to buffering writes to external memory. The discussion is also relevant to buffering writes destined for on-chip memory or input/output ports.

The write buffer unit is drained for various reasons discussed above such as a read operation or snoop request which corresponds to an address of an entry in the write buffer unit. In other embodiments, the write buffer could also be drained when a write operation is non-bufferable, a data synchronization command is detected or an atomic bus operation is detected.

The above embodiments store thirty-two bytes in each entry of the write buffer unit and burst two or four sixty-four bit words at a time. Other embodiments could change the number of data bytes in each entry. Additionally, the size of the burst could be two or more data packets where the packets could be eight or more bits.

In the embodiment of FIG. 4, the write buffer unit 208 retires entries 320 when full. However, the drain algorithm could be optimized in another embodiment. In order to determine how to drain each entry, the control unit 204 reads the write type field 332. Non-cacheable write operations and write-back operations are kept in the write buffer unit 208 until the write buffer is full. In contrast, write-through operations are written whenever the bus 112 is free. As mentioned above, the software may presume write-through operations are written to external memory 108 in short order. Accordingly, quickly writing a write-through operation to memory 108 is desirable.

In the embodiment of FIG. 5, a read operation causes writing a queued write operation to external memory. After writing, that data is retrieved by the read operation. To eliminate the unnecessary write to and read from memory, the read operation could retrieve the data directly from the write buffer unit.

The foregoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claim s be construed to include alternative embodiments to the extent permitted by the prior art.

What is claimed is:

1. A processing system which bursts data to a bus, the processing system comprising:

a memory cache unit comprising a cache memory and a controller, wherein the memory cache unit produces an address and data;

a write buffer unit comprising a plurality of entries, wherein the write buffer unit is coupled to the memory cache unit and the bus;

a compare circuit that compares the address to other addresses for the plurality of entries; and a control unit which directs the data to any of the plurality of entries, depending on a result of an address comparison executed by the compare circuit, and performs a burst operation that comprises writing a single address to the bus and a plurality of data words, wherein the write buffer unit comprises a plurality of entries, and wherein each entry comprises an address, a data block and a byte mask field.

2. The processing system as set forth in claim 1, wherein each entry further comprises a write type field and a valid bit.

3. The processing system as set forth in claim 1, wherein each data block comprises a plurality of bytes.

4. The processing system as set forth in claim 1, wherein the control unit determines if a write operation is bufferable.

5. The processing system as set forth in claim 1, wherein the control unit determines if a write operation is a complete block.

6. The processing system as set forth in claim 1, wherein the control unit merges data from multiple write operations.

7. A method for optimizing storage in a write buffer unit, the method comprising steps of:

receiving a first data and a first address of a single write access;

storing the first data to a data block of the write buffer unit;

receiving a second data and a second address of another single write access;

determining if the second address and the first address correspond to a same data block;

storing the second data to the data block of the write buffer unit; and comparing one of the first address and the second address to a plurality of addresses for a plurality of data blocks stored within the write buffer unit, wherein the comparing step comprises a step of noting data bytes received for a particular entry in the write buffer unit; and writing a byte mask in response to the noting step.

8. The method as set forth in claim 7, further comprising steps of:

storing the first address in the write buffer unit; and storing the second address in the write buffer unit.

9. A method for storing data in a write buffer unit and dispensing those data to a bus, the method comprising steps of:

receiving a plurality of data and a plurality of addresses respectively associated therewith;

arranging the plurality of data in the write buffer unit according to the plurality of addresses respectively associated therewith;

bursting a data block associated with a block address to the bus; and draining the write buffer unit, wherein the draining step is responsive to at least one of the following steps:
  comparing a read operation address to the plurality of addresses and finding a coincident address in the write buffer unit;
  comparing a snoop request address to the plurality of addresses and finding a coincident address in the write buffer unit;
  determining a write operation is non-bufferable;
  detecting a data synchronization command; and
  detecting an atomic bus operation.

10. The method as set forth in claim 9, wherein the arranging step comprises steps of:
  comparing the plurality of addresses; and
  arranging the plurality of data into data blocks.

11. The method as set forth in claim 9, wherein the bursting step comprises steps of:
  writing a block address to the bus; and
  writing a plurality of words from the data block in succession to the bus.

12. The method as set forth in claim 9, further comprising a step of evicting an entry from the write buffer unit, wherein the evicting step is responsive to a step of filling the write buffer.

13. The method as set forth in claim 9, further comprising a step of storing data in the write buffer unit.

14. The method as set forth in claim 9, further comprising a step of storing the block address in the write buffer unit.

15. A processing system which bursts data to a bus, the processing system comprising:
  a memory cache unit comprising a cache memory and a controller, wherein the memory cache unit produces an address and data;
  a write buffer unit comprising a plurality of entries, wherein the write buffer unit which are coupled to the memory cache unit and the bus;
  a compare circuit that compares the address to other addresses for the plurality of entries; and
  a control unit which directs the data to any of the plurality of entries, depending on a result of an address comparison executed by the compare circuit, and performs a burst operation that comprises writing a single address to the bus and a plurality of data words, wherein:
    the control unit directs the data at the address to any one of a plurality of address locations in the write buffer unit,
    the write buffer unit comprises a plurality of entries,
    each entry comprises an address, a data block and a byte mask field, and
    the write buffer unit further comprises a compare circuit which compares the address to other addresses.

16. A processing system which bursts data to a bus, the processing system comprising:
  a memory cache unit-comprising a cache memory and a controller, wherein the memory cache unit produces an address and data;
  a write buffer unit comprising a plurality of entries, wherein the write buffer unit which are coupled to the memory cache unit and the bus;
  a compare circuit that compares the address to other addresses for the plurality of entries; and
  a control unit which directs the data to any of the plurality of entries, depending on a result of an address comparison executed by the compare circuit, and performs a burst operation that comprises writing a single address to the bus and a plurality of data words, wherein:
    the control unit directs the data at the address to any one of a plurality of address locations in the write buffer unit,
    the write buffer unit comprises a plurality of entries,
    each entry comprises an address, a data block, a byte mask field, a write type field, and a valid bit, and
    the write buffer unit further comprises a compare circuit which compares the address to other addresses.

17. A processing system which bursts data to a bus, the processing system comprising:
  a memory cache unit comprising a cache memory and a controller, wherein the memory cache unit produces an address and data;
  a write buffer unit comprising a plurality of entries, wherein the write buffer unit which are coupled to the memory cache unit and the bus;
  a compare circuit that compares the address to other addresses for the plurality of entries; and
  a control unit which directs the data to any of the plurality of entries, depending on a result of an address comparison executed by the compare circuit, and performs a burst operation that comprises writing a single address to the bus and a plurality of data words, wherein:
    the control unit directs the data at the address to any one of a plurality of address locations in the write buffer unit,
    the write buffer unit comprises a plurality of entries,
    each entry comprises an address, a data block and a byte mask field,
    the write buffer unit further comprises a compare circuit which compares the address to other addresses,
    the control unit determines if a write operation is bufferable,
    the control unit determines if a write operation is a complete block, and
    the control unit merges data from multiple write operations.

18. A processing system which bursts data to a bus, the processing system comprising:
  a memory cache unit comprising a cache memory and a controller, wherein the memory cache unit produces an address and data;
  a write buffer unit comprising a plurality of entries, wherein the write buffer unit which are coupled to the memory cache unit and the bus;
  a compare circuit that compares the address to other addresses for the plurality of entries; and
  a control unit which directs the data to any of the plurality of entries, depending on a result of an address comparison executed by the compare circuit, and performs a burst operation that comprises writing a single address to the bus and a plurality of data words, wherein:

the control unit directs the data at the address to any one of a plurality of address locations in the write buffer unit, the write buffer unit comprises a plurality of entries, each entry comprises an address, a data block, a byte mask field, a write type field, and a valid bit, the write buffer unit further comprises a compare circuit which compares the address to other addresses, the control unit determines if a write operation is bufferable, the control unit determines if a write operation is a complete block, and the control unit merges data from multiple write operations.

* * * * *